United States Patent
Koch

(10) Patent No.: US 8,903,431 B2
(45) Date of Patent: Dec. 2, 2014

(54) LOCATION STAMPING AND LOGGING OF ELECTRONIC EVENTS AND HABITAT GENERATION

(71) Applicant: AT&T Intellectual Property I, L.P., Atlanta, GA (US)

(72) Inventor: Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1 day.

(21) Appl. No.: 13/975,979

(22) Filed: Aug. 26, 2013

(65) Prior Publication Data

US 2013/0345970 A1   Dec. 26, 2013

Related U.S. Application Data

(63) Continuation of application No. 13/274,633, filed on Oct. 17, 2011, now Pat. No. 8,521,413, which is a continuation of application No. 11/554,819, filed on Oct. 31, 2006, now Pat. No. 8,065,080.

(51) Int. Cl.
| | |
|---|---|
| *H04W 4/02* | (2009.01) |
| *H04W 4/12* | (2009.01) |
| *H04M 1/57* | (2006.01) |
| *G06F 17/00* | (2006.01) |
| *H04L 29/08* | (2006.01) |
| *G01C 21/00* | (2006.01) |

(52) U.S. Cl.
CPC ............. *G06F 17/00* (2013.01); *H04W 4/028* (2013.01); *H04W 4/027* (2013.01); *H04L 67/18* (2013.01); *H04L 67/22* (2013.01); *G01C 21/00* (2013.01)

USPC ............ 455/457; 455/414.2; 455/414.4; 455/415; 455/456.3; 701/454; 701/491; 701/520; 701/461; 340/944; 379/201.08

(58) Field of Classification Search
CPC ....... H04W 4/023; H04W 4/025; H04W 4/12; G01C 21/26
USPC ............. 455/414.1, 414.2, 457, 456.3, 415; 701/520
See application file for complete search history.

(56) References Cited

U.S. PATENT DOCUMENTS

| | | | |
|---|---|---|---|
| 2,434,603 | A | 1/1948 | Vedder |
| 5,086,394 | A | 2/1992 | Shapira |
| 5,583,564 | A | 12/1996 | Rao et al. |
| 5,652,789 | A | 7/1997 | Miner et al. |
| 5,961,569 | A | 10/1999 | Craport et al. |

(Continued)

OTHER PUBLICATIONS

U.S. Office Action dated Feb. 17, 2010 in U.S. Appl. No. 11/554,819.

(Continued)

Primary Examiner — Ari M Diacou
(74) Attorney, Agent, or Firm — Hartman & Citrin LLC

(57) ABSTRACT

Methods, systems, and computer-readable media provide for the detection, location stamping, and logging of electronic events and subsequent generation of habitat information. According to implementations, electronic events are detected and location stamped. Associated descriptions and other data corresponding to the electronic events is retrieved and stored along with the geographic locations of the electronic events in an activity log. The information in the activity log is used to generate visual representations of one or more geographic areas in which electronic events that meet user-defined or default criteria occurred within a predetermined frequency.

14 Claims, 8 Drawing Sheets

(56) References Cited

U.S. PATENT DOCUMENTS

| | | | |
|---|---|---|---|
| 5,968,109 A | 10/1999 | Israni et al. | |
| 5,978,804 A | 11/1999 | Dietzman | |
| 6,049,711 A | 4/2000 | Ben-Yehezkel et al. | |
| 6,091,948 A | 7/2000 | Carr et al. | |
| 6,125,326 A * | 9/2000 | Ohmura et al. | 701/454 |
| 6,163,799 A | 12/2000 | Kambayashi et al. | |
| 6,249,720 B1 | 6/2001 | Kubota et al. | |
| 6,321,158 B1 | 11/2001 | DeLorme et al. | |
| 6,363,254 B1 * | 3/2002 | Jones et al. | 455/456.1 |
| 6,392,548 B2 | 5/2002 | Farrington et al. | |
| 6,529,136 B2 | 3/2003 | Cao et al. | |
| 6,539,080 B1 | 3/2003 | Bruce et al. | |
| 6,539,232 B2 | 3/2003 | Hendrey et al. | |
| 6,618,593 B1 | 9/2003 | Drutman et al. | |
| 6,816,090 B2 | 11/2004 | Teckchandani et al. | |
| 6,819,919 B1 | 11/2004 | Tanaka | |
| 6,868,272 B1 | 3/2005 | Berkowitz et al. | |
| 6,975,938 B2 | 12/2005 | Odagawa et al. | |
| 7,071,842 B1 | 7/2006 | Brady | |
| 7,130,405 B2 | 10/2006 | Brown et al. | |
| 7,143,241 B2 | 11/2006 | Hull | |
| 7,370,085 B2 | 5/2008 | Brown et al. | |
| 7,515,042 B2 | 4/2009 | Benco et al. | |
| 7,526,309 B2 * | 4/2009 | Kronlund et al. | 455/550.1 |
| 7,565,154 B2 | 7/2009 | Yoon | |
| 7,603,108 B2 | 10/2009 | Sparks et al. | |
| 2001/0053999 A1 | 12/2001 | Feinberg | |
| 2002/0027981 A1 | 3/2002 | Bedrosian et al. | |
| 2002/0052786 A1 | 5/2002 | Kim et al. | |
| 2003/0096621 A1 | 5/2003 | Jana et al. | |
| 2003/0144870 A1 | 7/2003 | Kino | |
| 2003/0151507 A1 | 8/2003 | Andre et al. | |
| 2004/0001002 A1 | 1/2004 | Blum et al. | |
| 2004/0093392 A1 | 5/2004 | Nagamatsu et al. | |
| 2004/0198398 A1 * | 10/2004 | Amir et al. | 455/456.6 |
| 2005/0020277 A1 * | 1/2005 | Krumm et al. | 455/456.1 |
| 2005/0032527 A1 | 2/2005 | Sheha et al. | |
| 2005/0054352 A1 | 3/2005 | Karaizman | |
| 2005/0181771 A1 | 8/2005 | Cuddihy et al. | |
| 2005/0250552 A1 | 11/2005 | Eagle et al. | |
| 2006/0270419 A1 | 11/2006 | Crowley et al. | |
| 2007/0281689 A1 | 12/2007 | Altman et al. | |
| 2008/0057926 A1 * | 3/2008 | Forstall et al. | 455/415 |
| 2008/0070593 A1 | 3/2008 | Altman et al. | |
| 2008/0114543 A1 | 5/2008 | Vishnu | |
| 2008/0125959 A1 | 5/2008 | Doherty et al. | |
| 2008/0201069 A1 | 8/2008 | Suzuki | |
| 2010/0210290 A1 | 8/2010 | Riley et al. | |
| 2010/0246789 A1 | 9/2010 | Vance et al. | |
| 2011/0054775 A1 | 3/2011 | Snyder | |
| 2012/0040688 A1 | 2/2012 | Kobayashi | |
| 2012/0136529 A1 | 5/2012 | Curtis et al. | |

OTHER PUBLICATIONS

U.S. Office Action dated Jul. 21, 2010 in U.S. Appl. No. 11/554,819.
U.S. Office Action dated Nov. 1, 2010 in U.S. Appl. No. 11/554,819.
U.S. Office Action dated Apr. 4, 2011 in U.S. Appl. No. 11/554,819.
U.S. Notice of Allowance dated Jul. 15, 2011 in U.S. Appl. No. 11/554,819.
James P. Reid et al. Radio Tracking Manatees to Assess the Impact of Hydrologic Changes in Southwest Florida. Poster presented at the 16th Biennial Conference of the Estuarine Research Federation, Nov. 4-8, 2001. http://fl.biology.usgs.gov/posters/Manatee/Radio Tracking_Manatees/radio_tracking_manatees.htm Retrieved: Sep. 23, 2012.
Jim Reid et al. A data-logging GPS tag for Sirenians. Poster presentation at the Thirteenth Biennial Meeting of the Society for Marine Mammalogy, Nov. 28-Dec. 3, 1999. http://fl.biology.usgs.gov/posters/Manatee/GPS_Tag_for_Sirenians/gps_tag_for_sirenians. html Retrieved: Sep. 23, 2012.
Brad Stith et al. Modeling manatee movements to predict and assess the impact of hydrologic change in estuaries of southwestern Florida. http://fl.biology.usgs.gov/posters/Manatee/Modeling_Manatee_Movements/modeling_manatee_movements.htm Retrieved: Sep. 23, 2012 2:31 :56 PM Last updated: Jan. 7, 2011.
Brad Stith et al. Structure and Parameterization of an Agent-based Manatee Model for Southwestern Florida. Presented at the Manatee Population Ecology and Management Workshop, Apr. 1-4, 2002. http://fl.biology.usgs.gov/posters/Manatee/Agent_Based_Manatee_Model/agent_based_manatee_model.html Retrieved: Sep. 23, 2012.
U.S. Office Action dated Sep. 27, 2012 in U.S. Appl. No. 13/274,633.
Notice of Allowance dated Mar. 14, 2013 in U.S. Appl. No. 13/274,633.

\* cited by examiner

| | DATE | TIME | MY LOCATION | EVENT | ASSOCIATED DATA | BUDDIES PRESENT |
|---|---|---|---|---|---|---|
| 302A | 4/2/06 | 9:00 AM | THE FORUM SHOPPING CENTER | DETECT LOCATION | | |
| 302B | 4/2/06 | 9:05 AM | THE FORUM SHOPPING CENTER | DETECT LYNN PRESENT | | LYNN |
| 302C | 4/2/06 | 9:45 AM | BARNES & NOBLE | MASTERCARD PURCHASE | RECEIPT FILE | LYNN |
| 302D | 4/2/06 | 10:50 AM | BARNES & NOBLE | IN-STORE WIRELESS DOWNLOAD OF AUDIOBOOK | FILE DAVINCICODE.MP3 | LYNN |
| 302E | 4/2/06 | 12:00 PM | IPPOLITO'S | MENU SCAN | CALORIE COUNT = 850 | LYNN |
| 302F | 4/2/06 | 12:34 PM | IPPOLITO'S | MASTERCARD PURCHASE | RECEIPT FILE | LYNN |
| 302G | 4/2/06 | 12:40 PM | IPPOLITO'S | DETECT LYNN ABSENT | | |
| 302H | 4/3/06 | 10:19 AM | BILLY'S SOCCER FIELD | DIGITAL PHOTO CAPTURE | IMAGE FILE | BILLY |
| 302I | 4/4/06 | 4:34 PM | 5 MILES NE OF HOME | DETECT JOE PRESENT | | JOE |
| 302J | 4/5/06 | 10:23 AM | IN CAR, 23 MILES N OF WORK | CALL FROM STAN | AUDIO FILE OF CALL | |

FIG. 3

LOCATION STAMPING AND LOGGING OF ELECTRONIC EVENTS AND HABITAT GENERATION

CROSS REFERENCE TO RELATED APPLICATIONS

This application is a continuation of U.S. patent application Ser. No. 13/274,633 filed Oct. 17, 2011, now U.S. Pat. No. 8,521,413, issued on Aug. 27, 2013, entitled "Location Stamping and Logging of Electronic Events and Habitat Generation," which is a continuation of U.S. patent application Ser. No. 11/554,819 filed Oct. 31, 2006, now U.S. Pat. No. 8,065,080, issued on Nov. 22, 2011, entitled "Location Stamping and Logging of Electronic Events and Habitat Generation," which are incorporated by reference herein in their respective entireties.

TECHNICAL FIELD

This application relates generally to tracking user activities. More particularly, this application relates to logging the location of electronic events associated with a user and creating a user habitat from the logged information.

BACKGROUND

People often live extremely busy lives. Their daily activities may include going to work, taking care of children, maintaining a home, and participating in sports and other recreational activities. In a single day, a person might be in an automobile commuting to and from work and traveling between activities, walking in and out of the workplace, home, and stores, and meeting with various colleagues, family, and friends. To facilitate the completion of many of these tasks and in an attempt to bring some level of organization to their daily activities, many people carry personal electronic devices such as cellular telephones, personal data assistants (PDAs), and pagers. In some instances, because these electronic devices have allowed people to operate more efficiently, these devices have also allowed people to pack even more activities into their daily routine.

With the many activities that a person encounters during a day, a week, and a month, it becomes increasingly difficult to recall where and when many of these activities took place. Some people may have difficulty remembering where they were when they saw or heard something interesting. For example, a person may remember that she was talking to a certain friend on the phone when she passed a restaurant that she is interested in going to, but she cannot remember when she saw it, where it was, or when and where she was when she was talking to the friend on the telephone. Additionally, it would be helpful for a person to have access to information regarding the geographic areas in which she or someone else most commonly travels under varying circumstances in order to more efficiently plan her daily routine.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one embodiment of the disclosure presented herein, a method provides for tracking of electronic events associated with a mobile device. According to the method, an indicator is received, representing an occurrence of an electronic event associated with the mobile device. In response to receiving this indicator, location information corresponding to the location of the mobile device is retrieved. A description of the electronic event is retrieved and stored along with the location information in an entry of an activity log. According to various implementations, the location information corresponding to each activity log entry may be designated on a map. Location information on the map may additionally be grouped according to information within the activity log to create at least one user habitat.

According to another embodiment of the disclosure presented herein, a method provides for generating a user habitat. According to the method, multiple entries are stored within an activity log. Each entry includes a geographic location of an electronic event and multiple descriptors corresponding to the electronic event. Location designators corresponding to the geographic locations of the electronic events stored in the activity log are positioned on a map. A number of the location designators are represented as a habitat according to selected criteria from the activity log.

According to yet another embodiment of the disclosure presented herein, a computer-readable medium causes a computer to record instances of electronic events associated with a wireless device. A geographic location associated with each instance is also recorded. The geographic location of each instance is correlated with the electronic events on a map to create a habitat, which is displayed for a user. According to various embodiments, electronic event information associated with each instance of each electronic event may be retrieved and recorded along with the geographic location associated with each instance in an activity log. Habitat generating criteria that defines the parameters for generating the habitat may be received and used to select the electronic events and corresponding geographic locations for inclusion in the habitat. An area on the map that encompasses these selected geographic locations may be designated as the habitat.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

BRIEF DESCRIPTION OF THE DRAWINGS

FIG. 3 is a spreadsheet illustrating an example of an activity log according to one embodiment presented herein;

DETAILED DESCRIPTION

The following detailed description is directed to methods, systems, and computer-readable media for detecting, recording, and mapping electronic events and for generating geographic habitats using this recorded electronic event information. In the following detailed description, references are made to the accompanying drawings that form a part hereof, and which are shown by way of illustration specific embodiments or examples.

As discussed briefly above, during a typical day, many people may spend time at work, at home, shopping, commuting to and from work, taking their children to and from school and other activities, talking on a cellular phone, and participating in other activities. During most of these activities, most people are carrying, if not using, an electronic device such as a cellular telephone, PDA, or pager. According to implementations described herein, a mobile electronic device may be used to detect an electronic event, detect the location of the mobile device and associated user, store the electronic event and location in an activity log, use this information to map the geographic locations of various electronic events on a map, and organize the mapped locations of the electronic events into habitats.

As used herein, an electronic event is any activity or incident that may be captured and recorded by an electronic device. For example, a telephone call, an electronic mail (e-mail), an instant message (IM), taking a picture, listening to music or other audio files, receiving or sending data to another device via a short-range wireless link, or any other function in which an electronic device performs or may detect qualifies as an electronic event. Using the information stored within the activity log, a user is able to recall her location, as well as any other associated information, when the electronic activity occurred. For example, she will be able to recall when and where she was when she made a certain telephone call, when she exchanged music with her friend, and when she was in a meeting with a co-worker.

In addition, the user will be able to view all of these electronic events on a map, and group them together according to desired criteria to show a habitat, or a geographic area in which electronic events that met the desired criteria occurred within a predetermined frequency. Viewing a habitat will give a user a visual depiction of the geographic areas in which she most often travels during work or during the weekends, in which she most often talks on her cellular telephone, in which she most often makes purchases, or in which she most commonly meets a particular friend, as examples.

Figure 1:
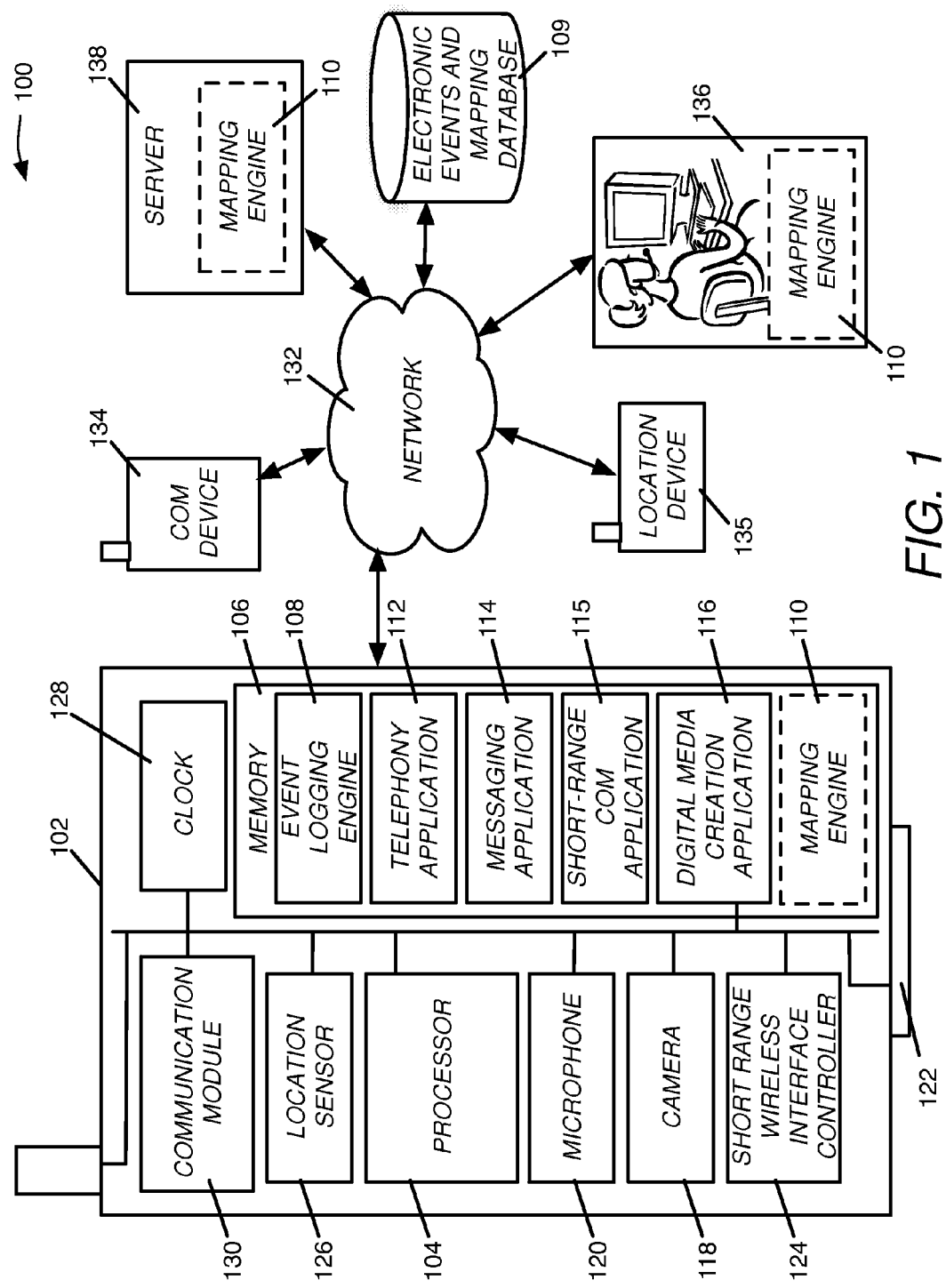
FIG. 1 is a block diagram illustrating an illustrative mobile computing device in which embodiments may be implemented according to the disclosure presented herein.

Referring now to the drawings, in which like numerals represent like elements through the several figures, aspects of the methods, systems, and computer-readable media provided herein will be described. FIG. 1 shows an illustrative mobile computing device 102. It should be understood that the mobile computing device 102 may be any electronic device capable of detecting an electronic event. As an example, the mobile computing device 102 may be a cellular telephone, PDA, pager, media player, or hand-held video game console. The mobile computing device 102 has a processor 104 and a memory 106. The processor 104 may comprise a general purpose central processing unit (CPU), a more specific purpose programmable logic controller (PLC), a pro-grammable gate array, or other type of processor known to those skilled in the art and suitable for controlling the operation of the mobile computing device 102.

The processor 104 is connected to the memory 106. The memory 106 may comprise a volatile or non-volatile memory that includes program code executed by the processor 104 for controlling the operation of the mobile computing device 102. According to one implementation, the memory 106 includes an event logging engine 108, a telephony application 112, a messaging application 114, a short-range communications application 115, a digital media creation application 116, and a mapping engine 110. As will be described in detail below, the event logging engine 108 detects an occurrence of an electronic event, collects all corresponding information relating to that event, and logs the electronic event and corresponding information into an activity log. Some of the information relating to electronic events is retrieved from an electronic events and mapping database 109. For clarity, FIG. 1 shows a representation of the electronic events and mapping database 109 as a single database. However, it should be understood that the electronic events and mapping database 109 may be multiple databases that are physically or communicatively connected to the mobile computing device 102, a server 138, a personal computer 136, or to a network 132. The telephony application 112 works in conjunction with a communication hardware module 130 to receive and transmit voice communications from and to any other communications device 134 via a wired or wireless connection to the network 132. Similarly, the messaging application 114 works in conjunction with the communication hardware module 130 to receive and transmit messages, such as electronic mail (e-mail) or instant messages (IMs), from and to any other communications device 134 via a wired or wireless connection to the network 132. To facilitate communications via the network 132, the mobile computing device 102 may include a network interface device and network connector (not shown).

The network 132 may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a WiMAX network, a cellular network, or a satellite network. Alternatively, the network 132 may be a wired network such as, but not limited to, a wired Wide Area Network (WAN), a wired Local Area Network (LAN) such as the Ethernet, a wired Personal Area Network (PAN), or a wired Metropolitan Area Network (MAN). The network 132 may include the Internet such that the mobile computing device 102 communicates with other devices via wireless or wired connections to the Internet.

The short-range communications application 115 works in conjunction with a short-range wireless interface 122 and a short-range wireless interface controller 124 in order to communicate with a local device, such as a location device 135, via a short-range communications network. As an example, the short-range wireless interface 122 may be an infrared interface, a BLUETOOTH transceiver, a barcode reader, or any other type of short-range wireless transmission or reception hardware. As will be described in detail below, the location device 135 is an example of a short-range transmission device that is used to provide electronic event description information to the mobile computing device 102 via the short-range wireless interface 122 and corresponding short-range wireless interface controller 124 and short-range communications application 115.

The digital media creation application 116 works in conjunction with any mobile computing device 102 media creation hardware to create media files. As an example, the digital media creation application 116 may be a photography application for creating and manipulating photographs and movie files using input from a built-in camera 118. Additionally, the digital media creation application 116 may receive input from a microphone 120 to create audio files. For example, the mobile computing device 102 may have audio recording software that records voice memos, dictation, or telephone conversations through the microphone 120. As described below, the creation of any media by the mobile computing device 102 is an electronic event that, along with a pointer to the stored media, is stored in an activity log for subsequent review, mapping, or habitat creation.

The mapping engine 110 is software that utilizes location information received from a location sensor 126 or from an activity log generated by the event logging engine 108 to plot the geographic locations of any number of recorded electronic events on a map for display. The mapping engine may utilize location information and various criteria, as described in detail below, to generate one or more habitats that visually depict a geographic area in which a user frequents. The mapping engine 110 is outlined with a dotted line within the memory 106 of the mobile computing device 102, as well as within the remote server 138 and the personal computer 136 associated with a user, to show that it may be located in one or all of these locations.

Typically, due to the memory and processing limitations of the mobile computing device 102 in comparison with the personal computer 136 or the server 138, and because of the screen size and resolution limitations of the mobile computing device 102, the mapping engine 110 will be located within the personal computer 136 where the user is most likely to utilize a map showing the locations of her associated electronic events or resulting habitats. In this implementation, the user utilizes the mobile computing device 102 for detecting and recording electronic events and the personal computer 136 for creating and analyzing resulting maps and habitats. However, it should be appreciated that the mapping engine 110 may be located within the mobile computing device 102 or within the remote server 138 and executed using the mobile computing device 102 and associated display.

The location sensor 126 may be a global positioning system (GPS) receiver. Using GPS technology, the mobile computing device 102 may populate an activity log with extremely accurate location information associated with electronic events, including information such as speed and altitude. Alternatively, the location sensor 126 may be hardware or software that utilizes cellular signal strength triangulation techniques for determining mobile computing device 102 location information. According to yet another alternative implementation, the location sensor 126 may be a receiver for receiving a short-range signal from the location device 135. According to this implementation, the location sensor 126 may be hardware or software that operates in conjunction with the short-range wireless interface 122 that receives a signal from the location device 135.

The location device 135 may be a transmitter that continuously or periodically transmits a short-range signal for detection by the location sensor 126. The signal received by the location device 135 may contain descriptive location information such as the name and address of a retail store in which the location device 135 is located, or it may transmit geographic coordinates identifying the location of the location device 135, and by association, the mobile computing device 102. Finally, the mobile computing device 102 includes a clock 128 that tracks the current date and time for time-stamping electronic events as they occur.

Figure 2:
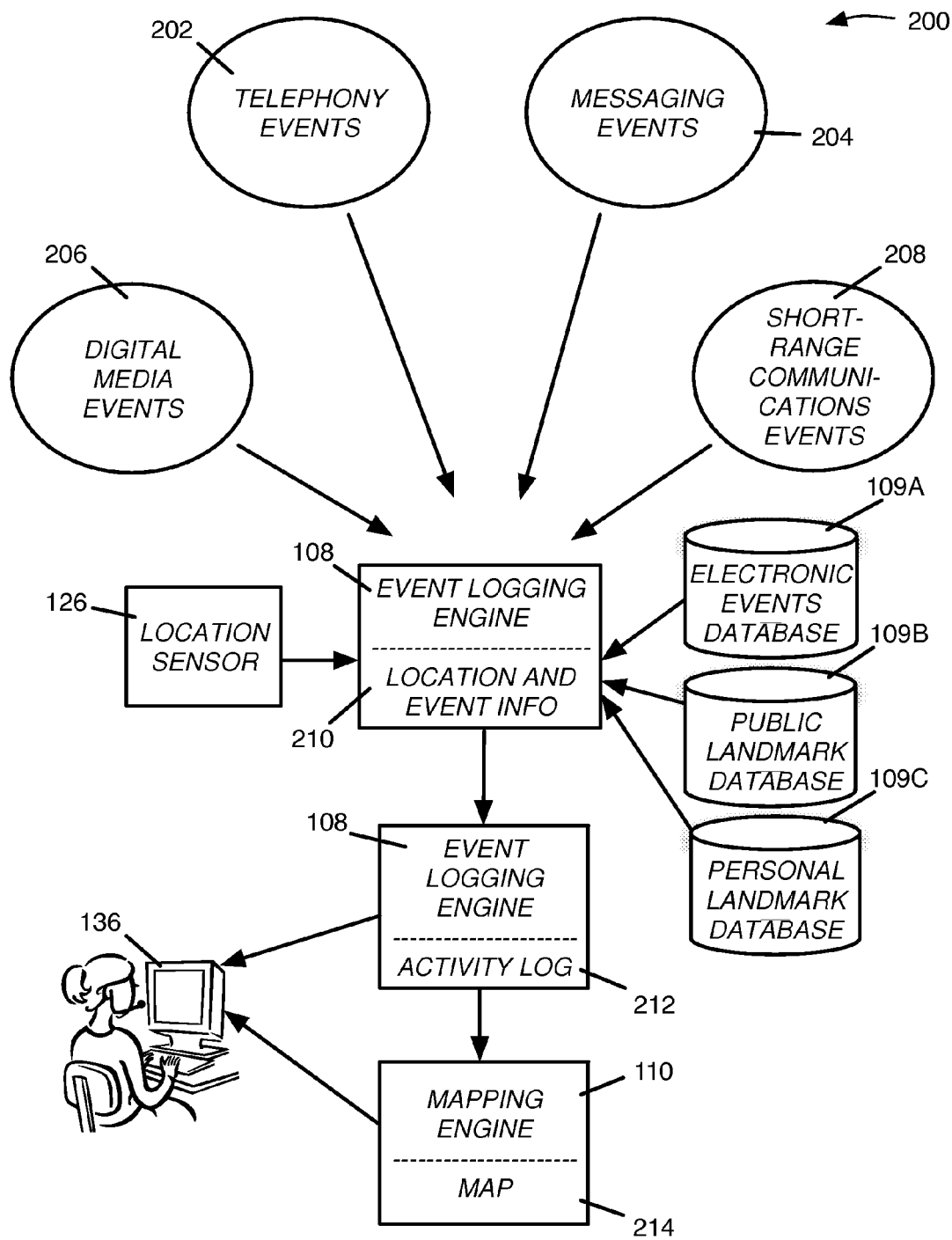
FIG. 2 is a block diagram illustrating an information flow between elements of a location stamping and mapping system 200 according to embodiments presented herein.

Turning now to FIG. 2, the flow of information in and out of the event logging engine 108 and other elements of a location stamping and mapping system 200 according to embodiments presented herein will be described. FIG. 2 is intended to illustrate a pictorial flow of information, while details of the actual processes will be described below with respect to FIGS. 6-8. The location stamping and mapping system 200 includes four categories of electronic events, telephony events 202, messaging events 204, digital media events 206, and short-range communications events 208. It should be understood that while electronic events are described as being associated with one or more of these event categories for illustration purposes, the disclosure presented herein is applicable to any number and type of electronic events, which do not have to be classified or categorized prior to being logged by the event logging engine 108 and mapped by the mapping engine 110.

The telephony events 202 include any telephone call or other voice communications between the mobile computing device 102 and the communications device 134 using the communications network 132. The messaging events 204 include any data transmissions between the mobile computing device 102 and the communications device 134, as well as any messaging actions or message manipulation. Examples include but are not limited to sending, receiving, reading, and deleting email, IMs, and text messages. The digital media events 206 include capturing, playing, and manipulating media. For example, taking photographs, recording media clips, and playing video and audio are digital media events.

The short-range communications events 208 include any unidirectional or bidirectional short-range communications between the mobile computing device 102 and an external device. It should be understood that the external device does not need to be a communications device or other electronic device. According to one implementation, the short-range wireless interface 122 of the mobile computing device 102 is a bar-code reader and the external device is a food item from a grocery store. By scanning items using the bar-code reader, the user may create a record of the date, time, and location of the grocery shopping trip and simultaneously create a grocery list. Other examples of short-range wireless interfaces include but are not limited to infrared (IR) and WiFi interfaces. Other examples of short-range communications events 208 include receiving electronic receipts and detecting other proximate electronic devices.

According to the location stamping and mapping system 200, as electronic events 202, 204, 206, and 208 occur, they are detected by the event logging engine 108. The electronic events and mapping database 109 is shown in FIG. 2 as being three databases, an electronic events database 109A, a public landmark database 109B, and a personal landmark database 109C. The electronic events database 109A stores electronic event descriptors corresponding to the electronic events 202, 204, 206, and 208. The event logging engine 108 detects an electronic event by activation of a particular hardware or software component of the mobile computing device 102 associated with the event.

For example, when the mobile computing device 102 receives a phone call, then either the receipt of the call request at the mobile computing device 102, the activation of the ring tone, the receipt of caller identification information, or the answering of the call may trigger the recognition of an electronic event 202. However, the trigger or indicator that an electronic event has been detected may be converted into a description of the event 210 that is more useful to the user prior to being stored in an activity log 212. This description may be stored in the electronic events database 109A and linked to the particular electronic event indicator. The event logging engine 108 is then able to retrieve the electronic event description 210 corresponding to the electronic event indicator from the electronic events database 109A and store it in the activity log 212. The electronic events database 109A may be populated with event descriptions 210 by a user or by the event logging engine 108 using data received as a result of the electronic event, such as caller identification information.

As a result of electronic event detection, the event logging engine 108 requests and receives raw geographic location coordinates of the mobile computing device 102 from the location sensor 126. While the raw coordinates may be used to plot the electronic event on a map 214, the raw coordinates may not be particularly useful to the viewer if stored in the activity log 212. As a result, the raw coordinates are converted into a location description 210 that is useful to the viewer prior to being stored in the activity log 212. The location description 210 may be a name of a store, intersection, workplace, home, or any other useful description. The location description 210 may further be a location described with respect to a public or personal landmark.

For example, the location description 210 may be "5 miles NE of home" to identify a location that is 5 miles from a personal landmark, home. Using the raw coordinates, the event logging engine 108 searches the public landmark database 109B and the personal landmark database 109C for one or more corresponding landmarks from which to describe the location of the electronic event. A subscriber profile established by the user may prioritize the landmarks from which the event logging engine 108 will use to describe the location. As an example, the user may wish to describe all electronic event locations with respect to the distance from work or from home, depending on whether the electronic event occurred closer to work or closer to home.

The public landmark database 109B and the personal landmark database 109C may be populated with landmarks by a user or by the event logging engine 108 using data received as a result of the electronic event, such as when the mobile computing device 102 receives a signal from the location device 135 transmitting the name and location of the retail store from which the location device 135 is transmitting. It should be appreciated that the electronic events database 109A, the public landmark database 109B, and the personal landmark database 109C may be a single database or multiple databases.

After aggregating the location and event information 210 from the location sensor 126 and the databases 109A, 109B, and 109C, the event logging engine 108 stores the location and event information 210 as an entry in the activity log 212. It should be appreciated that retrieving the location and event information 210 from the location sensor 126 and the databases 109A, 109B, and 109C may occur in real-time as each electronic event is detected or in batches at pre-determined time intervals. As described below, the user may view, search, and manipulate the activity log 212 using the personal computer 136. The activity log 212 may also be used by the mapping engine 110 to create a map 214 for the viewer on the personal computer 136. This process, as well as a sample map will be described below with respect to FIG. 4 and FIG. 7.

Referring now to FIG. 3, a sample activity log 212 will be described. The activity log 212 contains a number of entries 302A-302J. Each entry 302A-302J has location and event information 210 stored in any number of event descriptor fields 304, 306, 308, 310, 312, and 314. The event descriptor fields 304 and 306 include the date and time of the corresponding electronic event as received by the clock 128 of the mobile computing device 102. The event descriptor field 308 includes a location description corresponding to the geographic location where the electronic event took place with respect to a public or private landmark.

As an example, the event descriptor field 308 of entry 302F shows that the corresponding electronic event took place in IPPOLITO'S restaurant. This landmark was retrieved from the public landmark database 109B or from the personal landmark database 109C using the raw coordinates of the mobile computing device 102 as detected by the location sensor 126. Similarly, the event descriptor field 308 of entry 302I shows that the corresponding electronic event took place 5 miles NE of home. This description was stored in the personal landmark database 109C and retrieved by the event logging engine 108 upon receiving raw coordinates of the mobile computing device 102 from the location sensor 126. Looking at entry 302J, the location description stored within the event descriptor field 308 shows that the electronic event took place in a car, 23 miles N of work. Because the mobile computing device 102 contains a GPS receiver, the speed at which the mobile computing device 102 is moving may be determined from the GPS receiver. Because the speed is over a pre-determined threshold, the event logging engine 108 determines that the mobile computing device 102 is in a vehicle.

The event descriptor field 310 identifies the electronic events. As discussed above, the event logging engine 108 utilizes the electronic events database 109A to convert an electronic event indicator to the electronic event description and stores that description in the event descriptor field 310. The event descriptor field 312 includes any additional data associated with the electronic event, or links to any data file that is associated with the electronic event. For example, entry 302C corresponds to a MASTERCARD purchase made at BARNES & NOBLE. Because the store issued an electronic receipt, the event descriptor field 312 includes a link to the receipt file used to view the receipt. According to the illustrative embodiment shown in FIG. 2, the event descriptor field 312 includes links to an MP3 file, receipts, an image file, and an audio file of a recorded telephone call. Additional information, such as a calorie count as seen in entry 302E, may be included in the activity log 212.

The event descriptor field 314 identifies any "buddies" that were present during the electronic event. Buddies are other electronic devices with which the mobile computing device 102 may be able to communicate with using short-range communications or may detect as being in a close proximity to one another. As described briefly above with respect to the short-range communications application 115 and the network 132, the mobile computing device 102 may be able to detect the presence of the communications device 134. According to implementations described herein, electronic device characteristics associated with the short-range communication signals from the communications device 134 belonging to a known party identify the communications device 134 as belonging to a buddy.

These identifying device characteristics associated with the communications device 134 are correlated with a buddy description within the electronic events database 109A so that the mobile computing device 102 may detect when a buddy is present or within a predetermined distance from the mobile computing device 102. If a buddy is present for a predetermined amount of time, then the event logging engine 108 may determine and log that a meeting with the buddy has taken place. The mobile computing device 102 may additionally include an optional notification feature that will notify the user via an audible or visual notification when a buddy is detected. It should be understood that the disclosure presented herein is not limited to the amount and type of information shown in FIG. 3 to be stored within the activity log 212.

Figure 4:
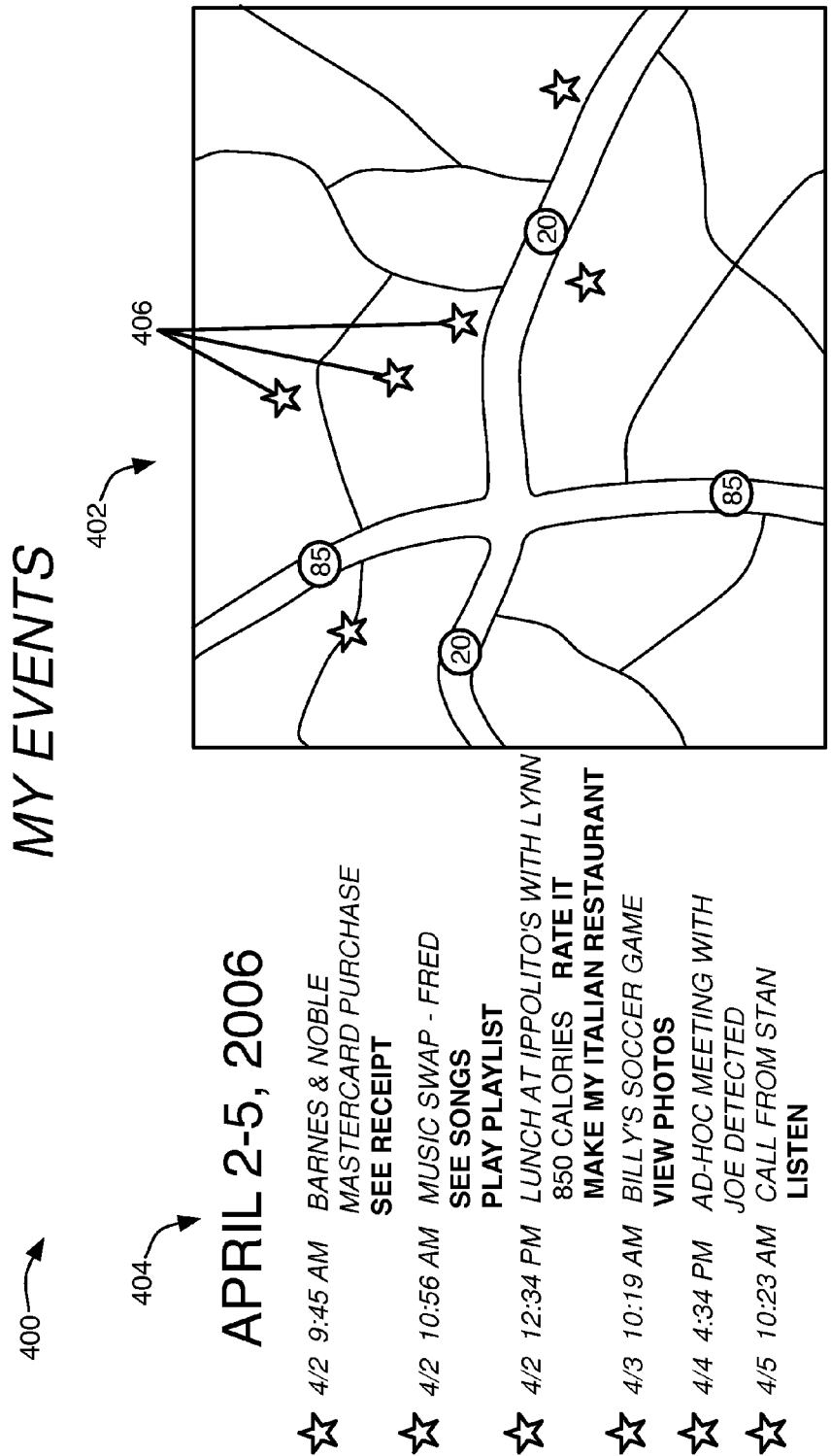
FIG. 4 is a map with an electronic event legend illustrating an example of a map showing the locations of electronic events according to one embodiment presented herein.

FIG. 4 shows an exemplary electronic events information screen 400, having a map 402 and an electronic event legend 404. The electronic events information screen 400 is displayed for the viewer after selecting the criteria for mapping electronic events. The mapping engine 110 may provide the user with a user interface for selecting the applicable criteria for generating the map 402. The user may choose to create a map showing the electronic events according to time, date, event type, location, or any other information stored within the activity log 212. Alternatively, the mapping engine 110 may be programmed with a set of default criteria to use when the user does not request any criteria. For example, the user may be able to select a single button to automatically provide a map having the last 10 electronic events plotted without any further user input.

After receiving the criteria for generating the map 402, the mapping engine 110 identifies the locations of the applicable electronic events using location designators 406 on the map 402. The mapping engine 110 creates the electronic event legend 404 that provides the event descriptions and other applicable information from the activity log 212 corresponding to the plotted events. The electronic event legend 404 may include links to any associated data files identified in the event descriptor field 312 of the activity log 212. For example, the user may click on the bold links associated with the electronic events to view electronic receipts, see and play songs transferred from another electronic device, view photos taken by the mobile computing device 102, and listen to a recorded telephone conversation. Additionally, the mapping engine 110 may search the Internet for links associated with certain landmarks and provide hyperlinks to the associated web pages in the electronic event legend, allowing the user to click on the links and be transported to related web pages where they can view additional information, rate a restaurant, add the restaurant to a list of favorites, or any other action associated with the electronic event. It should be understood that the electronic events information screen 400 may be configured according to the desires of the viewer, with as much or as little information related to the electronic events provided in the electronic event legend 404 or the map 402 as desired.

Figure 5:
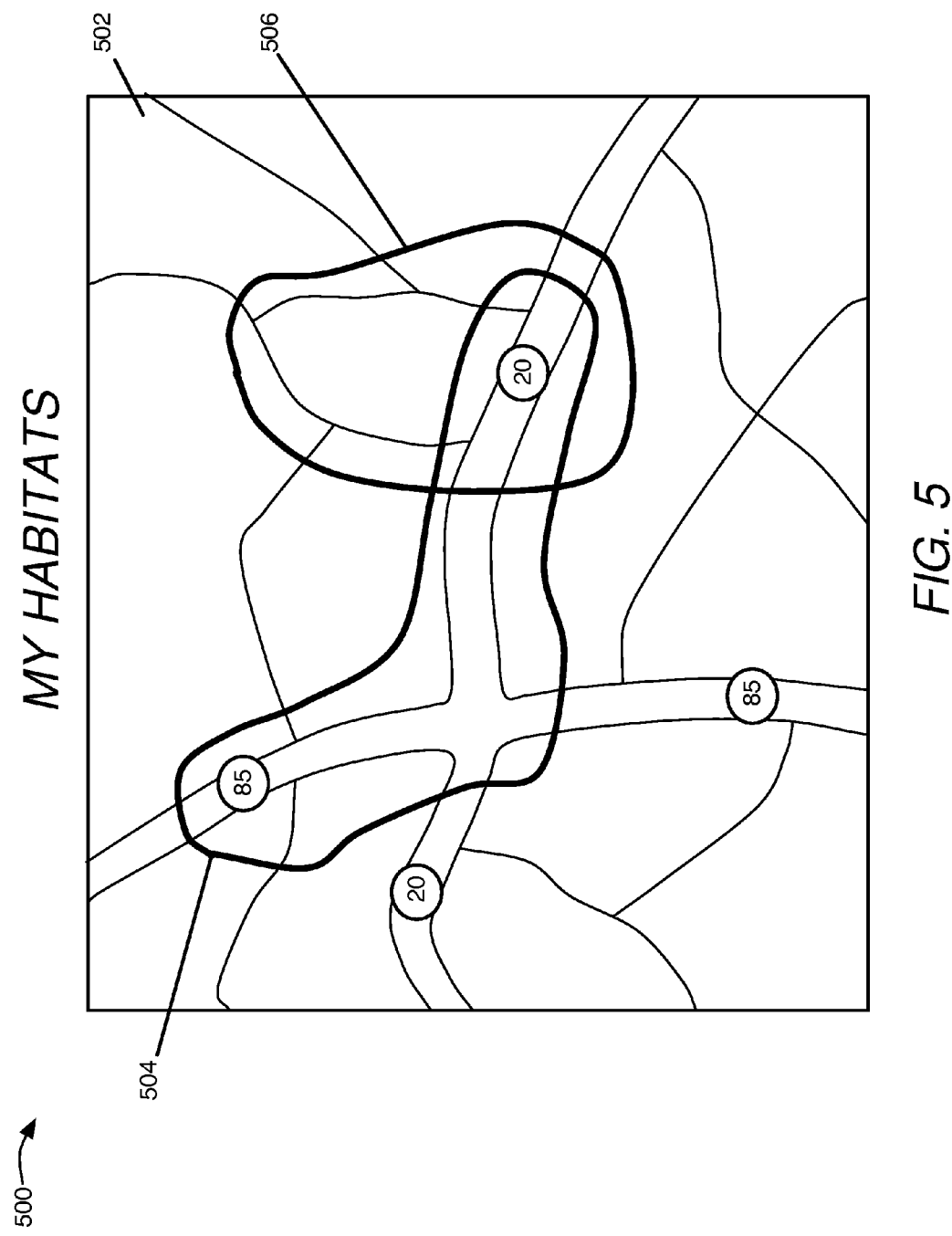
FIG. 5 is a map illustrating an example of habitats generated using location information associated with electronic events according to one embodiment presented herein.

FIG. 5 shows an exemplary habitat generation results screen 500, having a map 502 showing two different illustrative habitats, 504 and 506 respectively. The habitat generation results screen 500 is displayed for the viewer after selecting the criteria for creating one or more habitats from applicable entries of the activity log 212. According to various embodiments described herein, the mapping engine 110 may group locations of electronic events according to user-defined or default criteria in order to create user habitats. A habitat provides a visual representation on a map of the geographic areas in which the user most frequently travels or participates in certain electronic events according to the user-defined or default criteria. Through an interface provided by the mapping engine 110, the user may request a habitat and select the criteria for generating the habitat. The habitat may be generated according to the electronic event occurrences based on any of the location and event information 210 stored within the activity log 212 that meet the user-defined or default criteria.

For example, the habitat 504 might define a work habitat that encloses the geographic area in which electronic events during work hours took place during a range of dates or according to all of the electronic events stored in the activity log 212. The habitat 506 may define a shopping habitat that encloses the geographic area in which electronic events involving MASTERCARD purchases occurred during a range of dates, time, or frequency. It should be understood that the information stored within the activity log 212 may be sorted in any manner to build any number of habitats. The habitats may be limited in any manner such as to include only those electronic events that took place with a predetermined frequency or frequency range. It should also be appreciated that the habitats may be represented by any manner that visually represents the geographic area enclosed by the habitat. For example, while the habitats 504 and 506 are each represented by a solid line enclosing the geographic area within the habitat, the habitats 504 and 506 may alternatively be represented by shading, colors, highlighting the roads or other objects within each habitat 504 and 506 with a color, by creating an exploded view wherein each habitat 504 and 506 is projected off of the map 502, or by zooming into the map to enclose only the generated habitats 504 and 506 within a viewing area of the habitat generation results screen 500.

According to one implementation of the disclosure presented herein, the user may subscribe to the activity log 212 and the associated mapping and habitat generation features resulting in the electronic events information screen 400 and the habitat generation results screen 500 for another user. As an example, a parent may have the ability to subscribe to an activity log associated with a child. In doing so, the parent may remain well-informed as to the activities of their child. This implementation may have an associated opt-in and opt-out feature that requires a person to assent to being "monitored" by another party.

Figure 6:
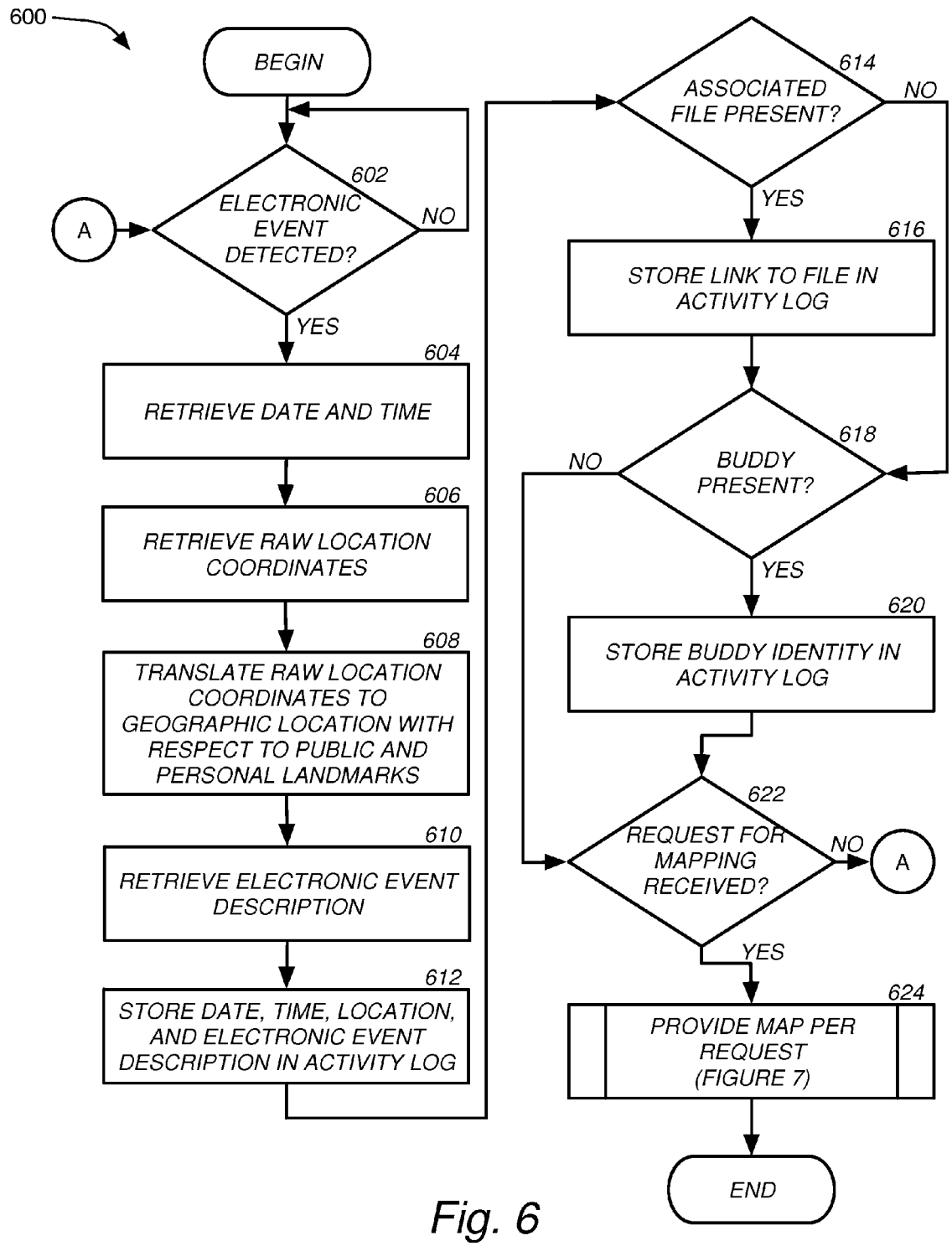
FIG. 6 is a flow diagram illustrating a method for detecting and logging electronic events according to one embodiment presented herein.

Referring now to FIG. 6, an illustrative routine 600 will be described for detecting and logging electronic events according to one embodiment presented herein. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 600 begins at operation 602, where the event logging engine 108 determines whether an electronic event has been detected. As described above, any action that may be detected and recorded by the mobile computing device 102 qualifies as an electronic event. If no electronic event is detected, the routine 600 remains at operation 602 and continues to monitor for events. If an electronic event is detected at operation 602, then the routine 600 continues to operation 604, where the event logging engine 108 retrieves the date and time from the clock 128. The event logging engine 108 retrieves raw location coordinates associated with the location of the mobile computing device 102 when the electronic event occurred from the location sensor 126. It should be understood that these coordinates may be retrieved at the onset of the electronic event, periodically or continuously as the electronic event occurs if it is an event such as a telephone call that has a substantial duration, or when the electronic event terminates.

From operation 606, the routine 600 proceeds to operation 608, where the event logging engine 108 translates the raw location coordinates into a geographic location description with respect to public and/or personal landmarks. As discussed above, the event logging engine 108 may search the public landmark database 109B and the private landmark database 109C for the closest public or private landmark corresponding to the raw location coordinates and provide a geographic location description with respect to that landmark. The routine 600 continues from operation 608 to operation 610, where the event logging engine 108 retrieves the electronic event description from the electronic events database 109A. The event logging engine 108 then stores the date, time, location, and electronic event description in the activity log 212 at operation 612.

The routine proceeds from operation 612 to operation 614, where the event logging engine 108 determines whether any file is associated with the electronic event. As discussed above, there may be files associated with an electronic event such as an image file, an audio recording, a video file, or an electronic receipt, for example. If the event logging engine 108 determines that there is an associated file at operation 614, then the routine 600 proceeds to operation 616 and the event logging engine 108 stores the associated file in the memory 106 of the mobile computing device 102 and stores a link to the file in the activity log 212. The routine then continues to operation 618. However, if at operation 614, the event logging engine 108 determines that there is not an associated file present, then the routine 600 proceeds directly to operation 618, where the event logging engine 108 determines if a buddy is present at the time of the electronic event or the electronic event is the detection of a buddy. If an electronic device associated with a pre-defined buddy is detected at operation 618, then the routine continues to operation 620, where the event logging engine 108 stores the identity of the buddy in the activity log 212 before continuing to operation 622.

However, if at operation 618, the event logging engine 108 does not detect a buddy present, then the routine 600 proceeds to operation 622, where the event logging engine 108 determines if a request for mapping has been received. If the event logging engine 108 determines that a request for mapping one or more electronic events has been received, then the routine 600 continues to operation 624, where the mapping engine 110 generates a map per the request and the routine 600 ends. However, if at operation 622, the event logging engine 108 determines that a request for mapping has not been received, then the routine returns to operation 602 and continues as described above.

Figure 7:
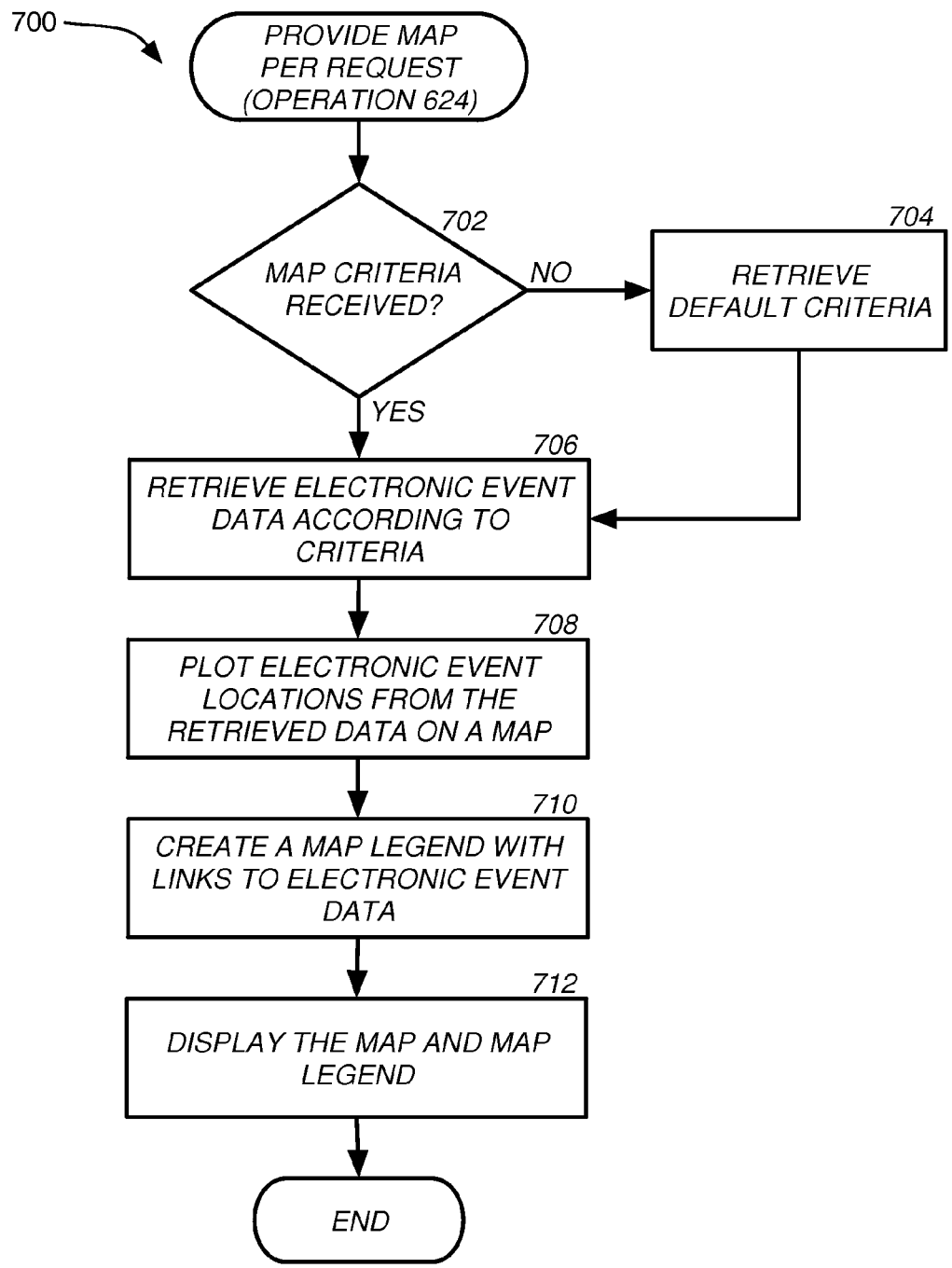
FIG. 7 is a flow diagram illustrating a method for mapping electronic events according to one embodiment presented herein.

Looking now at FIG. 7, a routine 700 for providing a map at operation 624 will be described. The routine 700 begins at operation 702, where the mapping engine 110 determines whether map criteria has been received from the user. As discussed above, the map criteria defines the parameters for mapping electronic events. The map criteria may be user-defined, allowing the user to input the criteria via a user interface, or may be pre-defined as default criteria. If the mapping engine 110 determines that map criteria has been received from the user, then the routine 700 continues to operation 706, where the mapping engine 110 retrieves electronic event data from the activity log 212 according to the user-defined criteria. However, if at operation 702, the mapping engine 110 determines that map criteria has not been received from the user, then the routine 700 proceeds to operation 704, where the mapping engine 110 retrieves the default criteria and then retrieves the electronic event data from the activity log 212 according to the default criteria at operation 706.

The routine 700 proceeds from operation 706 to operation 708, where the mapping engine 110 plots the electronic event locations from the retrieved activity log data on the map 402 using the location designators 406. From operation 708, the routine 700 continues to operation 710, where the mapping engine 110 creates the electronic event legend 404 with any applicable links to electronic event data. The routine 700 continues to operation 712, where the map 402 and the electronic event legend 404 are displayed for the user and the routine 700 ends.

Figure 8:
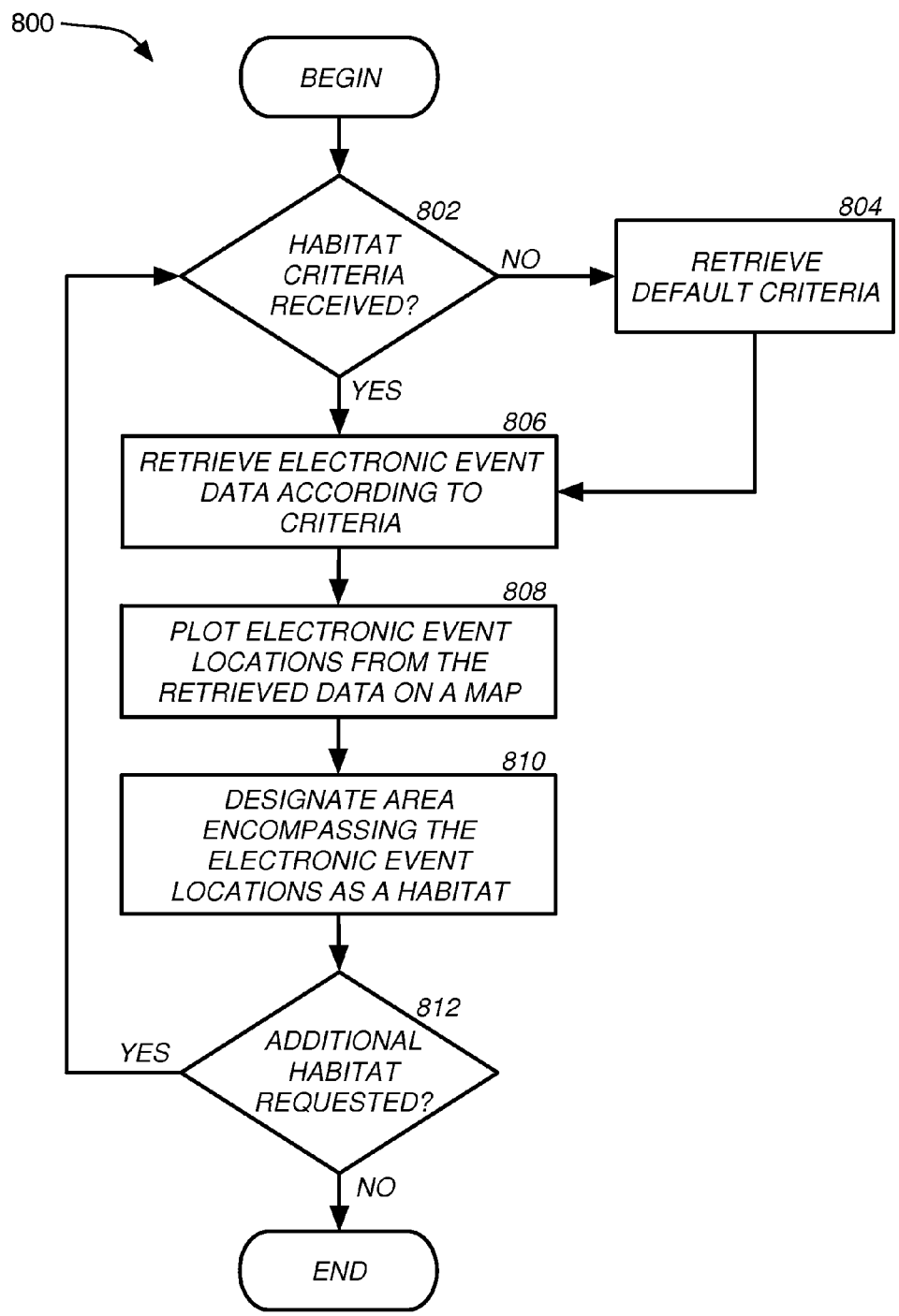
FIG. 8 is a flow diagram illustrating a method for creating a habitat according to one embodiment presented herein.

Turning to FIG. 8, an illustrative routine 800 for creating a habitat according to embodiments presented herein will be described. The routine 800 begins at operation 802, where the mapping engine 110 determines whether habitat criteria has been received from the user. As discussed above, the habitat criteria defines the parameters for creating one or more habitats from electronic event information stored within the activity log 212. The habitat criteria may be user-defined, allowing the user to input the criteria via a user interface, or may be pre-defined as default criteria. The habitat criteria may be based on any data stored in the activity log 212. Additionally, the user-defined criteria and the default criteria may establish parameters for including only electronic events that occur within a determined frequency. For example, if the user traveled to a location 100 miles from work on a particular day, but has never traveled to that location previous to that day or since that day, the mapping engine 110 may treat that event location as an anomaly and will not expand a requested work habitat to include that location.

If the mapping engine 110 determines at operation 802 that habitat criteria has been received from the user, then the routine 800 continues to operation 806, where the mapping engine 110 retrieves electronic event data from the activity log 212 according to the user-defined criteria. However, if at operation 802, the mapping engine 110 determines that habitat criteria has not been received from the user, then the routine 800 proceeds to operation 804, where the mapping engine 110 retrieves the default criteria. The routine 800 continues to operation 806, where the mapping engine 110 retrieves the electronic event data from the activity log 212 according to the retrieved default criteria.

The routine 800 proceeds from operation 806 to operation 808, where the mapping engine 110 plots the electronic event locations from the retrieved activity log data on the map 502. Alternatively, the mapping engine 110 will represent the habitats without plotting the individual electronic event locations that are included within the habitat as shown in FIG. 5. From operation 808, the routine 800 continues to operation 810, where the mapping engine 110 generates the requested habitat by designating the area encompassing the electronic event locations as the habitat. The routine 800 continues to operation 812, where the mapping engine 110 determines whether additional habitats are requested via a user interface. If additional habitats are requested, then the routine 800 returns to operation 802 and continues as described above. However, if the mapping engine 110 determines that additional habitats are not requested, then the routine 800 ends.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting.

Various modifications and changes may be made to the subject matter described herein without following the example embodiments and applications illustrated and described, and without departing from the true spirit and scope of the present invention, which is set forth in the following claims.

What is claimed is:

1. A method comprising:
   detecting, via a computer comprising a processor, an electronic event associated with a mobile device;
   retrieving, via the computer, raw location coordinates associated with a location of a mobile device;
   translating, via the computer, the raw location coordinates into a geographic location description with respect to a landmark;
   retrieving, via the computer, an electronic event description associated with the electronic event;
   retrieving, via the computer, a date and a time associated with the electronic event;
   storing, via the computer, the date, the time, and the electronic event description in an activity log;
   determining, via the computer, whether a file is associated with the electronic event based upon the electronic event description;
   in response to determining that a file is associated with the electronic event, storing, via the computer, a link to the file in the activity log;
   determining, via the computer, if a buddy is present at the time of the electronic event or if the electronic event comprises a detection of the buddy;
   if the computer determines that a buddy is present at the time of the electronic event or if the electronic event comprises a detection of the buddy, storing, via the computer, an identity of the buddy in the activity log;
   if the computer determines that a buddy is not present at the time of the electronic event or if the electronic event does not comprise a detection of the buddy, determining, via the computer, whether a request for mapping has been received; and
   if the computer determines that a request for mapping the electronic event has been received, generating, via the computer, a map per the request for mapping the electronic event.

2. The method of claim 1, wherein translating, via the computer, the raw location coordinates into the geographic location description with respect to the landmark comprises searching, via the computer, a landmark database for the landmark, the landmark comprising a closest landmark corresponding to the raw location coordinates.

3. The method of claim 2, wherein the landmark database comprises a public landmark database.

4. The method of claim 2, wherein the landmark database comprises a private landmark database.

5. The method of claim 1, further comprising determining, via the computer, whether map criteria has been received, the map criteria defining parameters for mapping electronic events.

6. The method of claim 5, wherein the map criteria comprises user-defined map criteria or pre-defined map criteria.

7. The method of claim 1, wherein the file comprises an image file, an audio recording, a video file, or an electronic receipt.

8. A computer-readable medium having computer-executable instructions stored thereon that, when executed by a processor, cause the processor to perform operations comprising:
   detecting an electronic event associated with a mobile device;
   retrieving raw location coordinates associated with a location of a mobile device;
   translating the raw location coordinates into a geographic location description with respect to a landmark;
   retrieving an electronic event description associated with the electronic event;
   retrieving a date and a time associated with the electronic event;
   storing the date, the time, and the electronic event description in an activity log;
   determining whether a file is associated with the electronic event based upon the electronic event description;
   in response to determining that a file is associated with the electronic event, storing a link to the file in the activity log;
   determining if a buddy is present at the time of the electronic event or if the electronic event comprises a detection of the buddy;
   if the computer determines that a buddy is present at the time of the electronic event or if the electronic event comprises a detection of the buddy, storing, via the computer, an identity of the buddy in the activity log;
   if the computer determines that a buddy is not present at the time of the electronic event or if the electronic event does not comprise a detection of the buddy, determining, via the computer, whether a request for mapping has been received; and
   if the computer determines that a request for mapping the electronic event has been received, generating, via the computer, a map per the request for mapping the electronic event.

9. The computer-readable medium of claim 8, wherein translating the raw location coordinates into the geographic location description with respect to the landmark comprises searching a landmark database for the landmark, the landmark comprising a closest landmark corresponding to the raw location coordinates.

10. The computer-readable medium of claim 9, wherein the landmark database comprises a public landmark database or a private landmark database.

11. A computer comprising:
   a processor; and
   a memory that stores instructions that, when executed by the processor, cause the processor to perform operations comprising
      detecting an electronic event associated with a mobile device,
      retrieving raw location coordinates associated with a location of a mobile device,
      translating the raw location coordinates into a geographic location description with respect to a landmark,
      retrieving an electronic event description associated with the electronic event,
      retrieving a date and a time associated with the electronic event;
      storing the date, the time, and the electronic event description in an activity log;
      determining whether a file is associated with the electronic event based upon the electronic event description,
      in response to determining that a file is associated with the electronic event, storing a link to the file in the activity log;
      determining if a buddy is present at the time of the electronic event or the electronic event comprises a detection of the buddy;

if the computer determines that a buddy is present at the time of the electronic event or the electronic event comprises a detection of the buddy, storing, via the computer, an identity of the buddy in the activity log;

if the computer determines that a buddy is not present at the time of the electronic event or the electronic event does not comprise a detection of the buddy, determining, via the computer, whether a request for mapping has been received; and if the computer determines that a request for mapping the electronic event has been received, generating, via the computer, a map per the request for mapping the electronic event.

12. The computer of claim 11, wherein translating the raw location coordinates into the geographic location description with respect to the landmark comprises searching a landmark database for the landmark, the landmark comprising a closest landmark corresponding to the raw location coordinates.

13. The computer of claim 12, wherein the landmark database comprises a public landmark database or a private landmark database.

14. The computer of claim 11, wherein the file comprises an image file, an audio recording, a video file, or an electronic receipt.

\* \* \* \* \*